(No Model.)

A. I. CAMPBELL.
BUTTON HOLE SCISSORS GAGE.

No. 464,750. Patented Dec. 8, 1891.

Witnesses
W. Rossiter
Mrs. M. S. Bemker

Inventor
Alice I. Campbell
By Bond & Adams,
Attys.

UNITED STATES PATENT OFFICE.

ALICE I. CAMPBELL, OF CHICAGO, ILLINOIS.

BUTTON-HOLE-SCISSORS GAGE.

SPECIFICATION forming part of Letters Patent No. 464,750, dated December 8, 1891.

Application filed June 11, 1891. Serial No. 395,953. (No model.)

*To all whom it may concern:*

Be it known that I, ALICE I. CAMPBELL, residing at Chicago, in the county of Cook and State of Illinois, and a citizen of the United States, have invented certain new and useful Improvements in Measuring Devices for Scissors, of which the following is a specification, reference being had to the accompanying drawings, in which—

Figure 1:
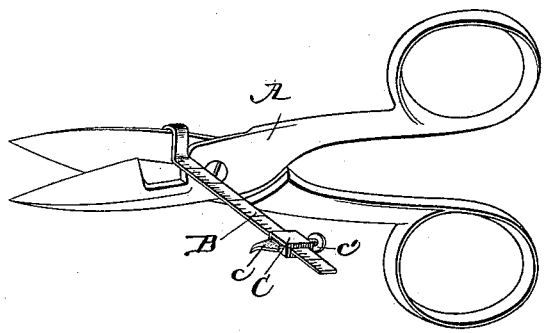
Figure 3:
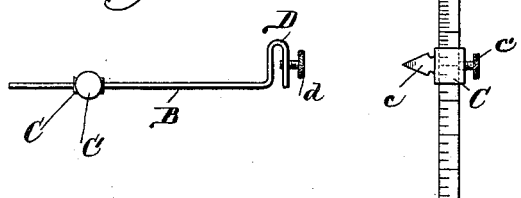
Figure 2:
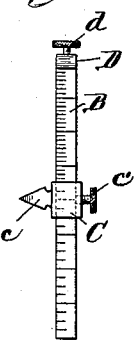

Figure 1 is a perspective view showing a pair of button-hole scissors with my improved attachment. Fig. 2 is a top or plan view, and Fig. 3 is a back view.

My invention relates to measuring devices adapted for use on scissors, shears, &c. The object of my invention is to provide a measuring device which may be attached to button-hole scissors for measuring the spaces between button-holes when cutting them. I accomplish this object, as hereinafter specified, and as illustrated in the drawings.

That which I regard as new will be pointed out in the claims.

In the drawings, A indicates a pair of button-hole scissors of ordinary construction.

B indicates a bar which is adapted to be secured to the scissors in such manner that it will extend horizontally and at right angles to the scissors-blade. The bar B is provided with a sliding indicator C, which is provided with a slot adapted to pass over the bar B, so that the indicator may slide lengthwise of the bar. The bar B is marked off in inches or fractions of inches, or in any other suitable manner, so that, by sliding the indicator C along the bar, the distance of the indicator from the scissors can be easily ascertained by examining the surface of the bar B. The indicator C is provided at one side of the bar B with a pointer c, which is curved downward, and is adapted to rest in the cut last made, in order to more definitely and accurately indicate the point where the next cut is to be made, and also to steady the scissors in cutting. The pointer c may be prolonged downward to extend through the button-hole, if desired.

c' indicates a set-screw suitably mounted on the indicator and adapted to secure the indicator upon the bar at any desired point.

The bar B is provided at its forward end with a hook D, preferably formed by bending the end of the bar into the shape of a hook, as best shown in Fig. 3. The hook D is adapted to fit upon one of the blades of the scissors and is provided at one side with a set-screw d, which is adapted to firmly secure the bar B to the blade of the scissors, as shown.

When the bar B is adjusted in position upon one of the blades of the scissors, it is firmly secured in place by means of the set-screw d, so that it will move as the scissors are operated.

In use the measuring device is first securely fastened upon one of the blades of the scissors in about the position shown in Fig. 1. The indicator C is then moved to a point upon the bar B equal to the distance which it is desired to leave between the successive button-holes and firmly secured at that point by the set-screw c'. After the first button-hole has been cut the end of the pointer c is placed in such button-hole and the cutting-edge of the scissors will thereby be moved to the point where the next button-hole should be cut. This renders the matter of cutting button-holes very simple, as the measurements are rendered very accurate, and no time is wasted in measuring to find the proper points at which the button-holes should be placed.

That which I claim as new, and desire to secure by Letters Patent, is—

1. The combination, with a bar adapted to be secured upon a pair of button-hole scissors, of an indicator adapted to slide upon said bar, and a pointer carried by said indicator and projecting from said bar, the end of the pointer being adapted to fit into a button-hole, substantially as described.

2. The combination, with a bar B, having a hook D and set-screw d, whereby it may be secured upon a scissors-blade, of an indicator C, adapted to slide upon said bar, set-screw c', and a pointer c, the end of said pointer being bent downward in such manner that it will be adapted to rest in a button-hole, substantially as and for the purpose specified.

ALICE I. CAMPBELL.

Witnesses:
Mrs. H. A. CLARKE,
JOHN L. JACKSON.